Jan. 17, 1939.                E. BAUMGRATZ                2,144,478
                                  HOSE
                           Filed March 10, 1937
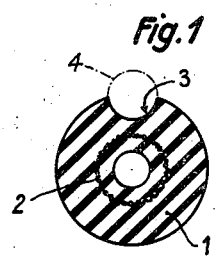 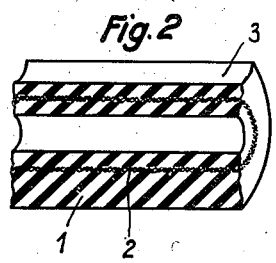
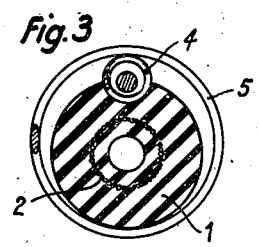 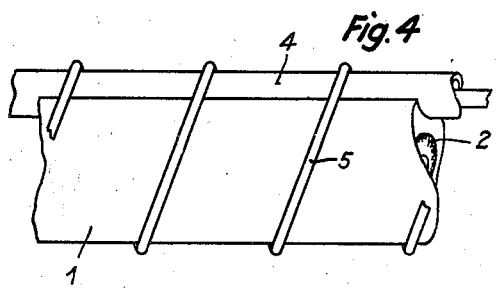
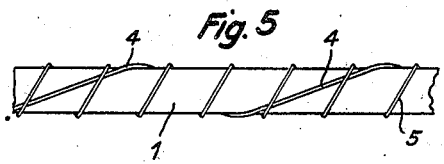
Inventor:
Ernst Baumgratz, deceased,
by Emma Baumgratz, neé Friedhofer,
sole representative of the heirs.
by Roy F. Steward
    attorney Patented Jan. 17, 1939

2,144,478

UNITED STATES PATENT OFFICE 2,144,478

HOSE

Ernst Baumgratz, deceased, late of Stuttgart, Germany, by Emma Baumgratz, née Friedhofer, Stuttgart, Germany, sole representative of the heirs, assignor to Robert Bosch Gesellschaft mit beschränkter Haftung, Stuttgart, Germany Application March 10, 1937, Serial No. 130,213
In Germany March 14, 1936

2 Claims. (Cl. 138—49)

The present invention relates to a hose for conveying spraying material, which is to be conveyed from a pump to a freely movable hand spraying piece, and consists in the feature that this hose is combined in such a way with a Bowden wire control for instance for adjusting the delivery amount of the pump from the hand spraying piece, that the Bowden wire sheath is embedded in a corresponding recess or groove in the hose.

One example of construction of the present invention in diagrammatically shown in the accompanying drawing, in which:

Figures 1 and 2 are, respectively, a cross section and a longitudinal section through a hose having a recess, but without the Bowden wire laid therein.

Figures 3 and 4, on the other hand, show a cross section and an elevation of a hose with the inlaid Bowden wire.

Figure 5 shows a particular mode of arrangement of the Bowden wire.

In these figures, I denotes a high pressure hose of rubber, in which a cotton insertion 2 for strengthening the hose is embedded. On the periphery of the hose a groove 3 is formed, which runs in the longitudinal direction of the hose and lies parallel to the core of the hose.

In Fig. 1 the sheath of the Bowden wire as it comes to lie in the groove 3 is indicated in chain-dotted lines.

In Figs. 3 and 4, the Bowden wire is shown laid in the groove 3, and together with the hose I, is lapped round by a wire helix 5. The turns of coils of this wire helix are so spaced from each other, that the hose with the inserted Bowden wire can be forced through between two such turns, owing to the possibility of springily bending the turns apart. In these circumstances, the hose and Bowden wire can be conveniently threaded at the same time into the finished helix, by the parts to be lapped round being introduced through between the coils into the helix by steadily revolving these parts with the helix.

Differing from the example of construction shown in Figs. 1 to 4, in the construction shown in Fig. 5 the recess for the Bowden wire, and thus this latter itself may be carried as a helix round the core of the hose, and is thereby given a somewhat greater flexibility than the structure consisting of the hose 1, the Bowden wire 4, and if required the wire helix 5.

What is claimed is:

1. A hose for conveying spraying material from a pump to a freely movable hand spraying apparatus, comprising a rubber hose having a groove in the periphery thereof, a Bowden wire remote control consisting of a core movable within a sheath, at least a part of the periphery of which, in section, is of similar cross section to that of said groove and is housed within said groove, and a wire helix wound around said hose and said Bowden wire sheath for retaining said sheath in said groove and for stiffening said hose as a whole.

2. A device of the character described comprising a rubber hose provided with a longitudinally extending peripheral groove, a Bowden wire mounted in said groove, and means for holding said Bowden wire in said groove.

EMMA BAUMGRATZ, née FRIEDHOFER,
Sole Representative of the Heirs of the Estate of
Ernst Baumgratz, Deceased.